May 31, 1966 D. H. SANDERS ETAL 3,253,742
SOLENOID ACTUATED PRESSURE PUMP FOR GREASE GUNS AND THE LIKE
Filed May 14, 1964 4 Sheets-Sheet 1
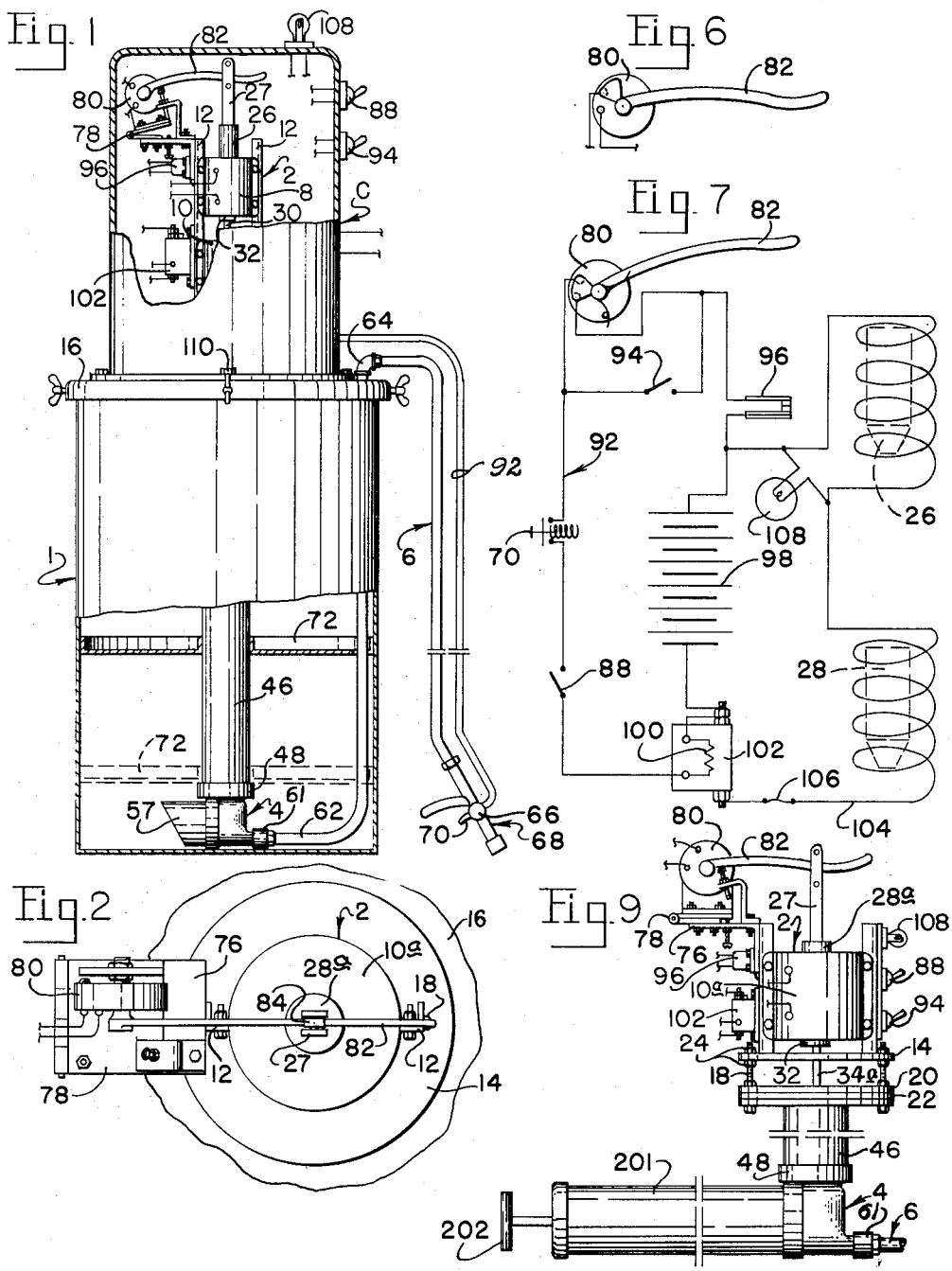
DAVID H. SANDERS
JAMES M. KENNEDY
INVENTORS
BY *Wayland D. Keith*
THEIR AGENT

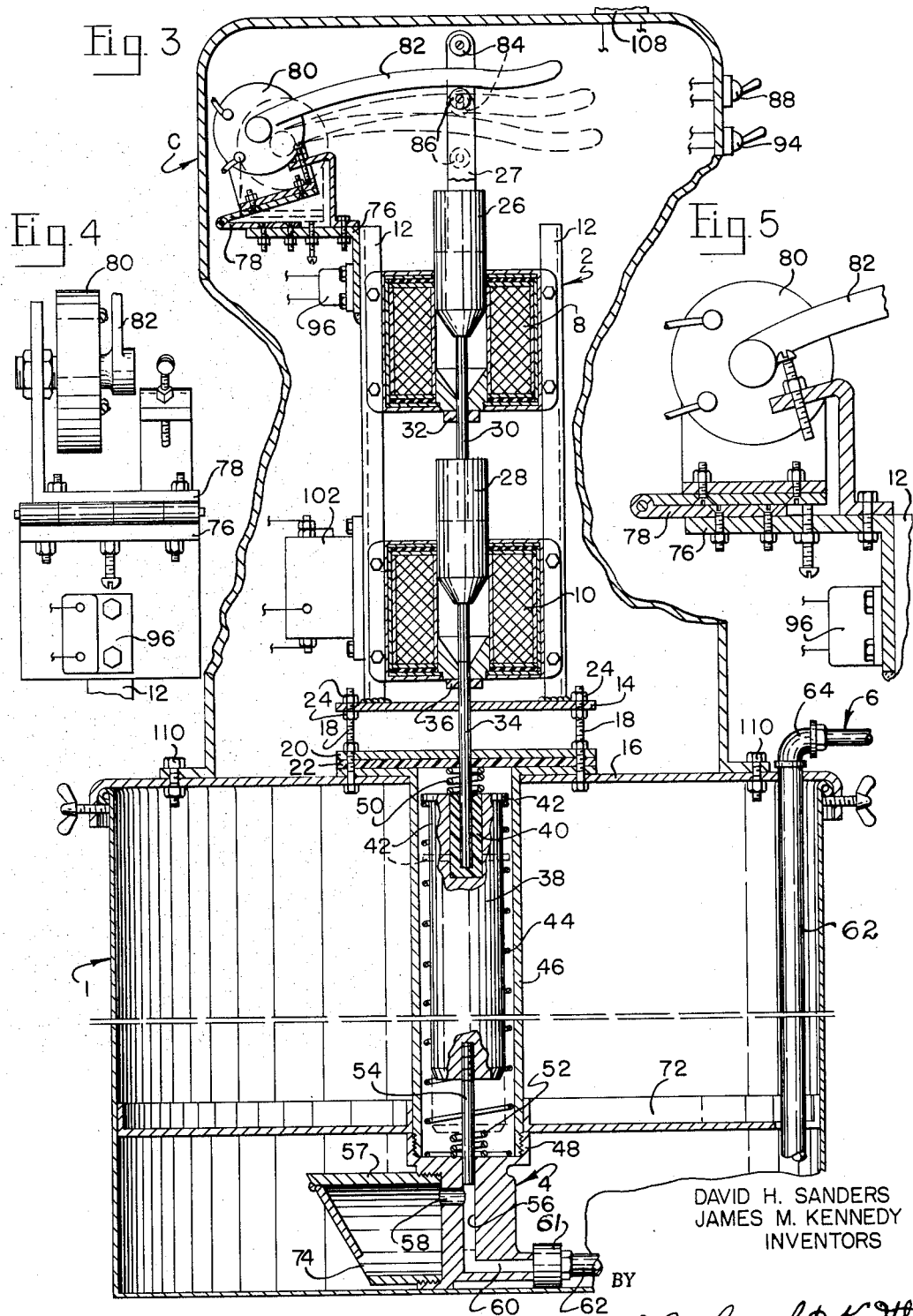

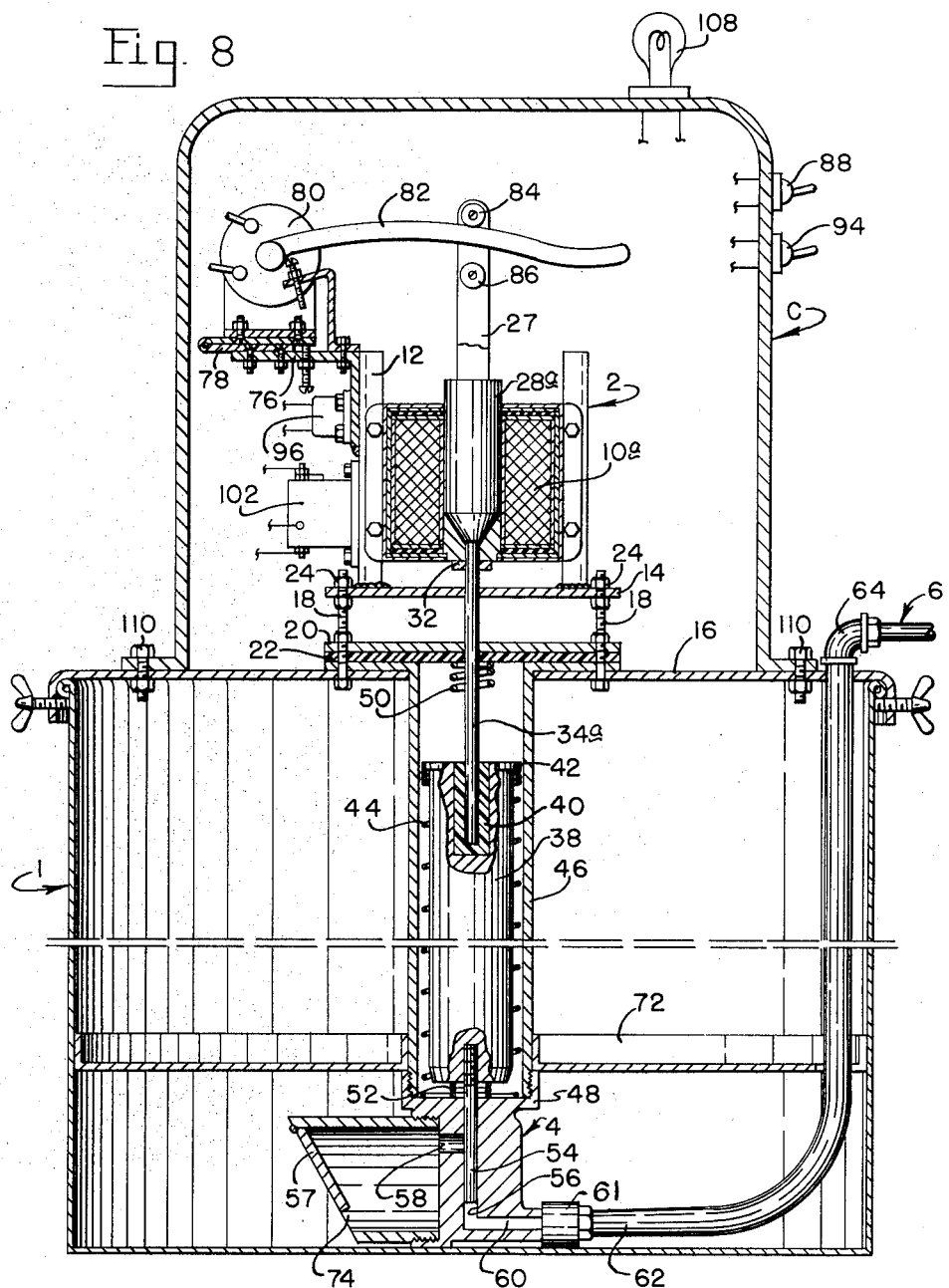

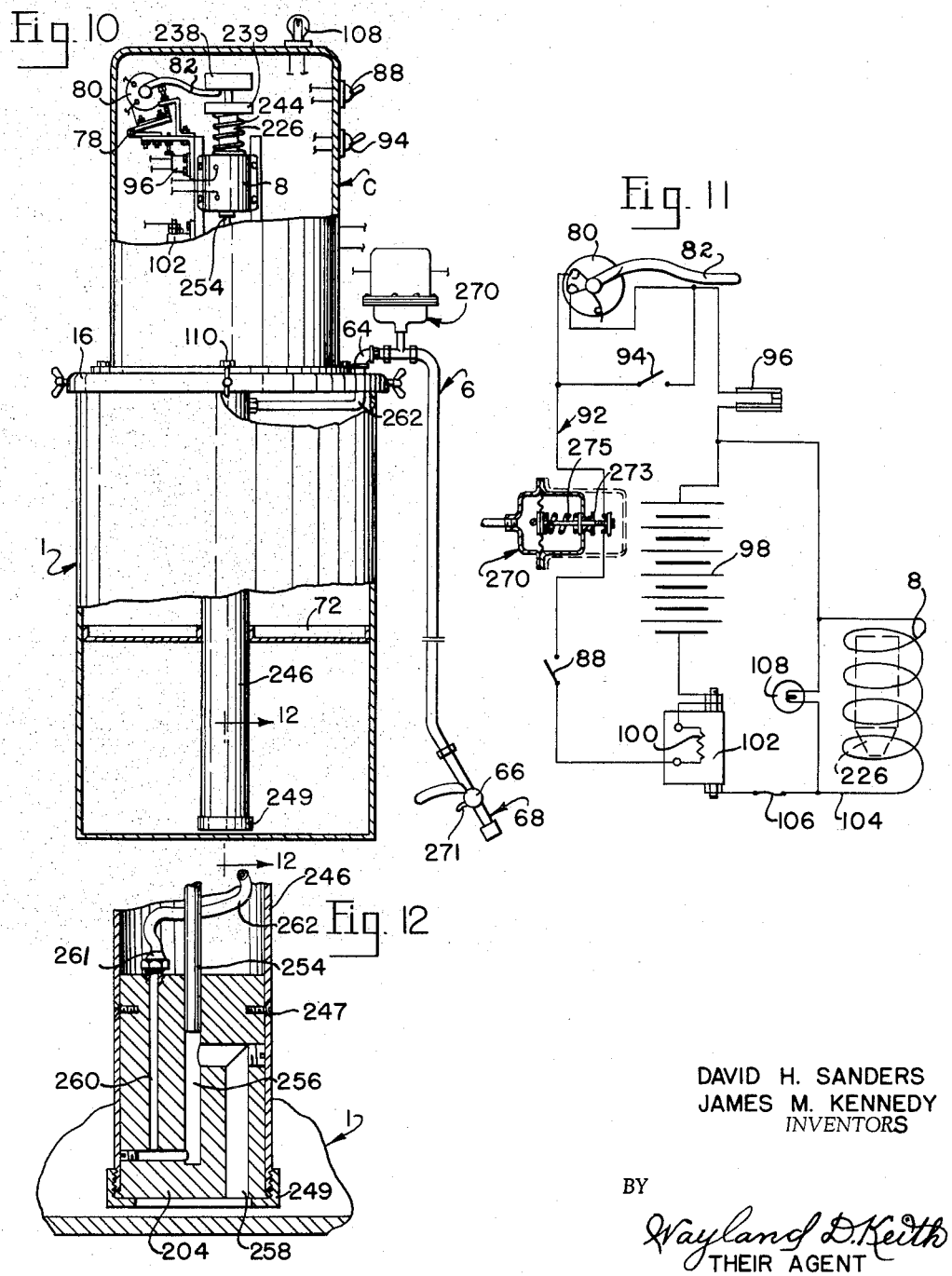

United States Patent Office 3,253,742
Patented May 31, 1966

3,253,742
SOLENOID ACTUATED PRESSURE PUMP FOR GREASE GUNS AND THE LIKE
David H. Sanders, Haskell, and James M. Kennedy, Hamlin, Tex., assignors of one-third to Wayland D. Keith, Wichita Falls, Tex.
Filed May 14, 1964, Ser. No. 367,313
12 Claims. (Cl. 222—54)

This invention relates to lubricating devices, and more particularly to lubricant dispensing devices for dispensing grease to lubricating fittings, such as cup grease or other heavy viscous greases which do not flow except under high pressure.

Various lubrication dispensing devices have been proposed heretofore, but these for the most part, were either manually actuated or actuated by high pressure air. Manually actuated lubricating devices may be used without respect to a source of power, however, these are tiring to operate and, where extensive lubrication is required, they present a fatigue problem for those using such devices. With respect to pneumatic pressure, this either requires a prime mover source of power, such as electric, internal combustion engine or steam power to drive a compressor to cause the air to be pumped to a relatively high pressure to enable the air actuated grease dispensing mechanism to be successfully operated.

The present device is so constructed that it is readily actuated either by A.C. current, such as 110 volt A.C. commercial electricity, or by 6 or 12 volt storage batteries, thereby enabling the device to be used in service stations on 110 volt "city current" or by a battery, as is in common use in motor vehicles, whereby the device may be readily connected thereto to dispense lubricant under high pressure equally as effectively as if by the use of high pressure air.

The present device may also be constructed to utilize standard commercial containers of grease, such as cup grease, to dispense grease therefrom to lubricate fittings on cars, trucks, and other bearings which utilize standard "Alemite" or "Zerk" fittings or the like. Furthermore, the present device may be so adapted as to enable the use of a regular hand type grease gun-barrel in connection therewith so that the grease may be fed from the grease gun-barrel under spring pressure, as is the usual custom. Grease used in this type of gun can either be bulk grease or "grease cartridges."

An object of this invention is to provide grease pumping equipment of a character that will dispense heavy cup grease and the like through a standard grease hose to grease fittings which are remote from the grease reservoir.

Another object of the invention is to provide an electrically energized, solenoid actuated grease dispensing pump to dispense grease, under high pressure, to and through a hand operated grease gun fitted on the end of a hose or the like, to enable grease to be dispensed either in minute quantities or in substantial quantities by the actuation of a control mechanism on the end of the hose to cause the electrically actuated solenoid to be energized each time grease is to be dispensed.

Another object of the invention is to provide a solenoid actuated grease dispensing mechanism which will deliver grease under pressure to a point remote from the grease reservoir by the actuation of a control switch on the hand gun dispensing the grease.

Still a further object of the invention is to provide a self contained prime mover element and pump connected in such manner that, upon application of power to the solenoids, the grease may be dispensed selectively under high pressure, either in small amounts or in quantity.

Still another object of the invention is to provide a self contained, power actuated solenoid motor and high pressure pump in a single composite unit which may be readily attached to or removed from a lubricant container without having to transfer the lubricant into a special container.

Still another object of the invention is to provide electrically energized, solenoid operated, high pressure grease pump which will not stall or burn out, but which will continue to operate so long as electrical energy is connected thereto to actuate the solenoid.

Still a further object of the invention is to provide a solenoid actuated, high pressure grease pump that may be controlled by an electrical switch which is actuated by the reciprocation of the solenoid, or the reciprocation of the solenoid may be controlled independently of the solenoid actuated switch.

Still a further object of the invention is to provide a thermal actuated switch which will open and close to prevent damage to the mechanism, should the switches remain on sufficient time to present the problem of overload heat.

Still another object of the invention is to provide a thermal switch which will open when a predetermined amount of heat is generated within the circuit and which will close at such periodic intervals as to give a uniform reciprocation to the armature of the solenoid actuated high pressure grease pump without the use of a mechanically actuated switch.

Another object of the invention is to provide low amperage through the control switches, and the higher amperage control is provided through a solenoid actuated switch, so as to prevent the burning of points of the control switches.

Another object of the invention is to provide an adjustable switch whereby the length of the stroke of the solenoid armature may be varied to obtain the correct grease dispensing volume from the grease pump which is attached thereto.

Still a further object of the invention is to provide an impact or inertia member intermediate the solenoid armature and the plunger of the high pressure grease gun so as to obtain the benefit of initial travel of the solenoid armature to deliver a blow at high pressure to the grease dispensing plunger of the high pressure pump.

Another object of the invention is to provide an electrically energized, solenoid actuated high pressure grease pump which may be readily installed on a "hand type" lubricating grease gun-barrel which may be readily used to dispense either bulk grease therefrom or grease from "grease cartridges."

Still another object of the invention is to provide an electrically energized, solenoid actuated, high pressure grease pump wherein a signal device is connected within the circuit to indicate the operation of the circuit.

A penultimate object is to provide a solenoid actuated high pressure grease pump which utilizes a plurality of solenoids energized simultaneously to produce uniform compounded action on a high pressure grease pump.

A final object of the invention is to provide a solenoid actuated, high pressure grease pump which is simple in construction, easy to control, effective in operation, low in the cost of manufacture, and relatively trouble free in operation.

With these objects in mind and others which will become manifest as the description proceeds, reference is to be had to the accompanying drawings in which like reference characters designate like parts in the several views thereof, in which:

FIG. 1 is an elevational view of a grease reservoir, showing a grease dispensing, solenoid actuated mechanism thereon, with parts broken away and parts shown in section to bring out the details of construction, and with parts shown in dashed outline to indicate relative movement of parts;

FIG. 2 is an enlarged, fragmentary top plan view of the solenoid, solenoid armature, and a switch mounted on a frame which switch is actuated by the reciprocation of the solenoid armature;

FIG. 3 is an enlarged fragmentary, elevational view with parts broken away, with parts shortened and with parts being shown in section to bring out the details of construction of the grease reservoir, high pressure grease pump, the solenoid motor, with a plurality of solenoids and armatures therein connected in end to end relation for simultaneous actuation of the high pressure grease pump, and showing the reciprocating actuated switch in full outline in one position and in dashed outline in alternate, different positions;

FIG. 4 is a greatly enlarged, side elevational view of the solenoid actuated switch, with parts thereof being broken away;

FIG. 5 is a view similar to FIG. 1, but taken at right angles thereto with portions thereof shown in section and showing the switch attached to a support member;

FIG. 6 is a fragmentary view of the solenoid actuated switch in "down or disconnected position";

FIG. 7 is a diagrammatic view of the wiring of the switches and solenoids, showing the source of power as being an electric storage battery, and showing the solenoid actuated switch in the "upper or closed position";

FIG. 8 is a view somewhat similar to FIG. 3, but of a solenoid actuated grease dispensing unit utilizing a single solenoid;

FIG. 9 is a further modified form showing the solenoid actuated mechanism attached to a "hand operated grease gun-barrel";

FIG. 10 is a view similar to FIG. 1, but showing a modified form of the invention;

FIG. 11 is a view similar to FIG. 7, but showing the wiring diagram of the wiring arrangement of the form of the invention shown in FIG. 10; and FIG. 12 is a sectional view taken on the line 12—12 of FIG. 10, looking in the direction indicated by the arrows.

With more detailed reference to the drawings, the form of the invention as shown in FIGS. 1 through 7 discloses a solenoid actuated, high pressure grease gun which utilizes a lubricant reservoir designated generally by the numeral 1, with a solenoid actuated mechanism designated generally at 2, which mechanism 2 actuates a high pressure grease pump designated generally by the numeral 4 to dispense grease into a hose designated generally by the numeral 6.

In the form of the invention as shown in FIGS. 1, 3, and 7, a plurality of solenoids, two in this instance, designated by numerals 8 and 10 respectively, are mounted in axially aligned relation on the respective support bars 12 which are secured to a base 14. The base 14 is secured to a cover plate 16 by bolts 18 so as to support base 14 a spaced distance above cover plate 16 and to support apertured support plates 20 and 22. Nuts 24 threadably engage bolts 18 to enable base 14 to be held in adjusted relation with respect to support plate 20 and cover plate 16. Each of the solenoids 8 and 10 has an independent armature 26 and 28 respectively slidably mounted therein, in a manner well known in the art of armatures. The armature 26 has a downwardly extending pin 30 which extends through the bushing 32 in guided relation and seats upon the upper face of armature 28.

The armature 28 has a downwardly extending pin 34, which pin extends through a bushing 36 in guided relation and through aligned apertures in base 14 and in support plates 20 and 22. The pin 34 extends down into an impact or inertia member 38, which has an axial bore therein, which, preferably has a plastic bushing 40 therein. The inertia member 38 has an out-turned flange 42 on the upper end thereof to receive a relatively weak spring 44 thereunder, which spring 44 surrounds impact or inertia member 38 and extends downward through housing 46 to the lower end thereof. The housing 46 is screwthreaded onto the upper side 48 of high pressure grease pump 4. The spring 44 is relatively weak, but is of sufficient strength to support inertia member 38 and armatures 26 and 28 so that an upwardly extending yoke 27 thereon will be moved to the uppermost position, as shown in FIG. 3, when the solenoids 8 and 10 are de-energized.

A pair of relatively strong springs 50 and 52 surround solenoid pin 34 and a pump plunger 54 respectively so that upon downward movement of inertia member 38, the inertia member will be cushioned by spring 52 to retard the downward movement thereof. However, in so doing, the compressive force of the spring 52 will act to throw the inertia member 38 upward which, together with spring 44, will return the inertia member 38 upwardly against relatively strong spring 50. The springs 44, 50, and 52 are of such strength that they may be coordinated with the movement of the armatures 26 and 28 to utilize the force of the rebound of these springs to accelerate the movement of the armatures 26 and 28, thereby lessening the amount of force required to start the movement of inertia member 38 and the pump plunger 54.

The pump plunger 54 extends into pump cylinder 56 and, when in up or retracted position, it is above grease inlet hole 58 in the body of grease pump 4, however, on normal downward movement the plunger 54 will move to approximately the dashed line position below the end thereof. However, impact or inertia member 38 will move with such force that it will move away from pin 34 to a position within cylinder 56 near the distal end thereof. In this manner the extra force applied by the inertia of impact or inertia member 38 will be added to the plunger 54, thereby enabling high pressure to be obtained by the grease pump 4.

A grease outlet opening 60 connects with the lower end of cylinder 56, and a high pressure lubricating conduit 62 is secured thereto in fluid communication. The grease is directed upward through conduit 62 and out through fitting 64 into a hose, designated generally by the numeral 6. The hose 6 may be of the high pressure type to sustain high pressure at all times. Upon the closing of a switch, such as indicated at 66, on hand gun nozzle 68, the solenoids 8 and 10 are electrically energized to move armatures 26 and 28 to actuate pump plunger 54 to dispense grease from hand gun nozzle 68. Trigger 70 may be provided to actuate the switch 66. This avoids, but does not necessarily preclude, the use of a pressure actuated switch such as is now in general use, and enables the grease to be dispensed upon opening a valve on hand gun nozzle 68. However, with the present switching arrangement, the solenoids 8 and 10 may be instantaneously energized to dispense a minute quantity of grease by actuation of pump plunger 54; or by holding the switch in closed position, the actuation of the pump plunger will continue so long as grease is desired. A check valve 61 is provided intermediate a grease outlet opening 60 and the conduit 62 to maintain grease pressure in conduit 62 and hose 6 upon return of pump plunger 54.

A conventional follower plate 72 is shown within lubricant reservoir 1 in FIGS. 1 and 3, so as to urge the grease downward to pass into inlet opening 74 and thence through inlet hole 58 into cylinder 56. One of the support bars 12 has a base plate 76 mounted thereon and extending outwardly therefrom, on which a hinge member 78 is secured. The other side of the hinge member 78 has an arcuately movable switch 80 secured thereto. The switch 80 is of the on and off type, upon movement of arm 82. The arm 82 extends between the members of upstanding yoke 27 with a roller element 84 positioned above arm 82 and a roller 86 positioned therebelow. This arrangement enables the free movement of armatures 26 and 28 over a considerable distance before contacts are made or broken, and by having the switch 80 pivotally mounted on hinge member 78, a still further movement is accorded, as will best be seen in dashed outline in FIG. 1. The armature 26 has a downwardly extending pin 30 resting on top of armature 28. The armature 28 has a pin 34 extending downwardly therefrom which is seated within shock absorbing plastic bushing 40 which is fitted within inertia member 38.

The switch 80, as shown in FIGS. 6 and 7, is alternately opened and closed by movement of the armature 26 of solenoid 8, which switch 80, as will best be seen in FIG. 7, is normally in series with switches 88 and 94 within a control circuit designated by the numeral 92. A switch 94 is connected in shunted relation within the circuit. A further switch 96 is a bi-metallic thermal actuated switch and is in series with switches 66, 80, 88, and/or 94, which switches form the controls within circuit 92 which circuit is connected to a battery 98, which control circuit 92 has a solenoid winding 100 therein to actuate a conventional solenoid switch 102 to connect a circuit 104 with battery 98. Thereby the battery 98 will supply electrical power to the windings of solenoids 8 and 10 to simultaneously actuate the armatures thereof. This enables smaller solenoid armatures to be used and enables positive power to be applied thereto to actuate the plunger 54. A circuit breaker or fuse 106 is within circuit 104 so as to protect the windings of the solenoids 8 and 10 against damage due to overheating, should the current be excessive. A signal light 108 is shunted across the winding of solenoid 8 so that a light will flash or other signal element will be actuated each time the circuit is opened and closed. The thermal switch 96 will open the control circuit 92 when a predetermined amount of heat is generated within the circuit, and which thermal switch 96 will close at such periodic intervals as to give uniform reciprocation to the armature 26 of solenoid 8, so as to actuate a high pressure grease pump 4, without the use of a mechanical switch, such as switch 80. The circuit 104 has a circuit breaker or fuse 106 therein to protect the windings of solenoids 8 and 10 against damage due to overheating, which is independent of the thermal switch 96, which is utilized as a timing switch.

While battery 98 has been shown as a source of power, which is desirable where it is impossible to obtain city current, it is merely representative of a source of electrical energy, as the solenoids may be operated on A.C. current in a manner well known in the art of solenoids.

While the solenoid actuated pump has been described in connection with high pressure lubrication, it is to be understood that the pump piston and cylinder may be varied in size to pump a desired volume of any fluid at a predetermined pressure, for any use to which the device is applicable.

SECOND FORM OF INVENTION

A second form of the invention as shown in FIG. 8, which is similar in construction to the form of the invention shown in FIGS. 1, 3, and 7, utilizes the same principle of operation, except a single solenoid 10a is utilized to actuate an armature 28a having a downwardly extending pin 34a thereon, which armature 28a in turn moves inertia member 38 upon the energization of solenoid 10a. The inertia member 38 is identical in both forms of the invention, however, the solenoid 10a is wound to accommodate the particular voltage the unit is designed to use. A cover C is secured to the cover plate 16 by bolts 110 so as to prevent the entrance of water into the working mechanism. The elements on the second form of the invention are numbered to correspond with the corresponding parts on the first form of the invention and are interchangeable therewith, except for the solenoid and some of the elements connected therewith.

THIRD FORM OF INVENTION

A third form of the invention is shown in FIG. 9, which is similar to the form of the invention as shown in FIG. 8, except the grease reservoir is designated by the numeral 201, which is a conventional hand power grease gun type and which has a plunger 202 which may be used to refill the reservoir 201, and when the plunger 202 is released, a spring (not shown) within the reservoir 201 will urge the grease into an inlet hole 58 which leads to cylinder 56, as shown in FIG. 8. The cover C has been dispensed with in the form of the invention as shown in FIG. 9, and the electrical circuiting is substantially that shown in FIG. 7, except only one solenoid is used instead of the two shown in FIG. 7. A switch 66 is provided on the end of the hose 6 substantially in the manner shown in FIG. 1 so as to enable the remote actuation of the solenoid 10a. The other parts of this form of the invention are substantially as shown in FIG. 8 and carry numbers corresponding thereto, with the exception of grease reservoir 201 and plunger 202.

The grease gun, arranged in the present manner, enables the unit to be readily moved from place to place either by hand, within a car or the like, without the necessity of using a truck. While the reservoir 201 has been described as being a reservoir to contain grease, this may either be bulk or grease cartridges, which are well known in the art of hand operated grease guns.

By adjusting nuts 24 on bolts 18, an increase or decrease of pressure may be brought to bear on return spring 44 and also the plunger 54 may be adjusted with respect to the discharge opening 60 and the inlet hole 58.

FOURTH FORM OF INVENTION

With more detailed reference to the form of the invention as shown in FIG. 10, this form of the invention involves substantially all the elements and performs substantially the same functions as the form of the invention as shown in FIG. 1, except a pressure switch 270 is in fluid communication with hose 6, and, upon a predetermined pressure being reached, the switch 270 will cause the circuit to open, which will de-energize the solenoid winding 8. In this manner the hand gun nozzle 68 may be inserted onto a conventional grease fitting and the trigger 271 of the hand gun nozzle 68 may be operated to open a valve to release grease. Upon release of pressure from hose 6, the pressure actuated switch 270 will cause the contacts thereof to close, and the armature 226, within solenoid winding 8 will reciprocate plunger 254 to draw lubricant in through inlet hole 258 into cylinder 256 on the upstroke and to discharge lubricant out through discharge opening 260 into conduit 262 which leads to hose 6.

The pressure switch 270 preferably has screwthreaded adjustment 273 so as to vary the tension on spring 275 so the pressure at which the contact points of switch 270 open may be varied to meet particular requirements.

The conduit 262 is preferably coiled in such manner as to enable the body, designated generally at 204, to be moved below the lower end of housing 246, and after the conduit 262 is connected to body 204 by a check valve 261, the body 204 may be moved into apertured housing 246 and screws 247 passed through apertures in housing 246 and screwthreaded into body 204. A screw threaded ring 249 threadably engages the lower end of housing 246 to further retain body 204 against downward movement, upon reciprocation of plunger 254.

In the present form of invention, inertia weights 238 and 239 are mounted on the upper end of solenoid armature 226 and are spaced apart to receive the end of arm 82 therebetween to actuate arcuately movable switch 80. A spring 244 surrounds the armature 226 and has the lower end thereof in bearing engagement with the upper end of the housing of solenoid winding 8 and the upper end of the spring is in bearing engagement with the lower side of inertia weight 239.

By having the tubular housing 246 encasing the body 204 and the conduit 262, the follower plate 72 does not have to be modified, as in the aforementioned modified form of invention.

Except for the modification as described, all corresponding parts, as shown in the other forms of the invention carry like numerals, as do corresponding parts of this modification thereof.

Having thus clearly shown and described the invention, what is claimed as new and is desired to be secured by Letters Patent is:

1. A mechanism for dispensing grease under high pressure, which mechanism comprises:
   (a) a lubricant reservoir,
      (1) a mounting plate associated with said reservoir,
   (b) a pump cylinder,
      (1) said pump cylinder associated with said mounting plate on said reservoir,
   (c) a pump plunger fitted within said pump cylinder,
      (1) said pump cylinder having an inlet opening formed near the end of the inlet stroke of said plunger in said cylinder and being in communication with said lubricant reservoir,
      (2) said pump cylinder having a grease discharge opening formed therein at the distal end thereof,
   (d) a conduit leading from said grease discharge opening,
   (e) a nozzle on the end of said conduit,
   (f) a solenoid,
      (1) said solenoid being associated with said mounting plate on said reservoir,
      (2) said solenoid including an electrical winding and having an electrical circuit associated therewith, and
   (g) an armature mounted within said solenoid for actuation thereby,
      (1) said pump plunger being operatively associated with said solenoid armature,
      (2) an independent inertia member associated with said solenoid armature for movement therewith, and
   (h) switch means within said electrical circuit and associated with said mounting plate to sequentially energize the winding of said solenoid.

2. A mechanism for dispensing grease under high pressure, which mechanism comprises:
   (a) a lubricant reservoir,
      (1) a mounting plate associated with said reservoir,
   (b) a pump cylinder,
      (1) said pump cylinder being associated with said mounting plate on said reservoir,
   (c) a pump plunger fitted within said pump cylinder,
      (1) said pump cylinder having an inlet opening formed near the end of the inlet stroke of said plunger in said cylinder and being in communication with said lubricant reservoir,
      (2) said pump cylinder having a grease discharge opening formed at the distal end thereof,
   (d) a conduit leading from said grease discharge opening,
   (e) a nozzle on the end of said conduit,
   (f) a solenoid,
      (1) said solenoid being associated with said mounting plate on said reservoir,
      (2) said solenoid including an electrical winding and an electrical circuit associated therewith,
   (g) an armature mounted within said solenoid for actuation thereby,
      (1) said pump plunger being operatively associated with said solenoid armature,
   (h) switch means within said electrical circuit and associated with said mounting plate to sequentially energize the winding of said solenoid,
   (i) a thermal switch means in series within said electrical circuit,
      (1) said thermal switch being adapted to open when a predetermined amount of heat is generated within said circuit, and
      (2) said thermal switch being adapted to close at such periodic intervals as to give uniform reciprocation to said solenoid armature.

3. A mechanism for dispensing grease under high pressure, which mechanism comprises:
   (a) a lubricant reservoir,
      (1) a mounting plate associated with said reservoir,
   (b) a pump cylinder,
      (1) said pump cylinder being associated with said mounting plate on said reservoir,
   (c) a pump plunger fitted within said pump cylinder,
      (1) said pump cylinder having an inlet opening formed near the end of the inlet stroke of said plunger in said cylinder and being in communication with said lubricant reservoir,
      (2) said pump cylinder having a grease discharge opening formed at the distal end thereof,
   (d) a conduit leading from said grease discharge opening,
   (e) a nozzle on the end of said conduit,
   (f) a solenoid,
      (1) said solenoid being associated with said mounting plate on said reservoir,
      (2) said solenoid including an electrical winding and an electrical circuit associated therewith,
   (g) an armature mounted within said solenoid for actuation thereby,
      (1) said pump plunger being operatively associated with said solenoid armature,
   (h) momentary contact switch means operatively associated with said solenoid armature to be opened and closed in co-ordination with the movement of said solenoid armature,
      (1) said switch means having an arm pivotally mounted thereon and extending outward therefrom,
      (2) said arm pivotally mounted on said switch, being arcuately movable with respect to said mounting plate upon movement of said solenoid armature,
   (i) a thermal responsive switch means in series with said momentary contact switch,
      (1) said thermal switch being adapted to open when a predetermined amount of heat is generated within the circuit and which will close at such periodic intervals as to give uniform reciprocation of said solenoid armature.

4. A mechanism for dispensing grease under high pressure, as defined in claim 3, wherein:
   (a) said electrical circuit includes a further solenoid,
      (1) said solenoids being connected in series within said electrical circuit for simultaneous energization and being physically operable in unison,
   (b) a solenoid actuated switch, which solenoid actuated switch is operable by said first mentioned switch means to close said electrical circuit through said solenoids to actuate said solenoid armature and said pump plunger.

5. A mechanism for dispensing grease under high pressure, as defined in claim 1, wherein:
   (a) said inertia member is mounted on said pump plunger intermediate said pump cylinder and said solenoid armature.

6. A mechanism for dispensing grease under high pressure, as defined in claim 1; wherein
   (a) said solenoid has a solenoid pin extending axially therefrom,
   (b) said inertia member is axially positioned in alignment with said solenoid pin and being movable in one direction upon movement of said solenoid armature, (c) said pump plunger mounted axially on the end of said inertia member opposite said solenoid pin,
   (1) said inertia member being operatively associated with said solenoid pin,
(d) said inertia member and said pump plunger being independently movable with respect to said solenoid pin, and
(e) spring return means to return said inertia member into engagement with said solenoid pin.

7. A mechanism for dispensing grease under high pressure, which mechanism comprises:
   (a) a lubricant reservoir,
      (1) a mounting plate associated with said reservoir,
   (b) a pump cylinder,
      (1) said pump cylinder being associated with said mounting plate on said reservoir,
   (c) a pump plunger fitted within said pump cylinder,
      (1) said pump cylinder having an inlet opening formed near the end of the inlet stroke of said plunger in said cylinder and being in communication with said lubricant reservoir,
      (2) said pump cylinder having a grease discharge opening formed therein at the distal end thereof,
   (d) a conduit leading from said grease discharge opening,
   (e) a nozzle on the end of said conduit,
   (f) a solenoid,
      (1) said solenoid being associated with said mounting plate on said reservoir,
      (2) said solenoid including an electrical winding and an electrical circuit associated therewith,
   (g) an armature mounted within said solenoid for actuation thereby,
      (1) said pump plunger being operatively associated with said solenoid armature,
   (h) switch means within said electrical circuit and associated with said mounting plate to sequentially energize the winding of said solenoid,
   (i) an inertia member mounted on said pump plunger intermediate said pump cylinder and said solenoid armature,
      (1) said inertia member having an outstanding abutment formed thereon a spaced distance from an end thereof,
      (2) a spring surrounding said inertia member, one end of which spring is fitted against said abutment and the other end of said spring being fitted against said pump cylinder so as to support the weight of said inertia member.

8. A mechanism for dispensing grease under high pressure, which mechanism comprises:
   (a) a lubricant reservoir,
      (1) a mounting plate associated with said reservoir,
   (b) a pump cylinder,
      (1) said pump cylinder being associated with said mounting plate on said reservoir,
   (c) a pump plunger fitted within said pump cylinder,
      (1) said pump cylinder having an inlet opening formed near the end of the inlet stroke of said plunger in said cylinder and being in communication with said lubricant reservoir,
      (2) said pump cylinder having a grease discharge opening formed therein at the distal end thereof,
   (d) a conduit leading from said grease discharge opening,
   (e) a nozzle on the end of said conduit,
   (f) a solenoid,
      (1) said solenoid having a base mounted thereon,
      (2) said solenoid being associated with said mounting plate on said reservoir,
      (3) said solenoid including an electrical winding and an electrical circuit associated therewith,
         (i) an arcuately movable switch hingeably mounted on said base,
         (ii) an arm pivotally mounted on said switch and extending outwardly therefrom,
         (iii) a projection on said armature,
         (iv) said arm operatively engaging said projection and being movable thereby,
         (v) said arm being adapted to open and close said arcuately movable switch upon relative, pivotal movement of said arm,
      (4) means limiting the arcuate movement of said switch,
   (g) an armature mounted within said solenoid for actuation thereby,
      (1) said pump plunger being operatively associated with said solenoid armature,
      (2) said switch means within said electrical circuit and associated with said mounting plate to sequentially energize the winding of said solenoid.

9. A mechanism for dispensing lubricant, under high pressure, which mechanism comprises:
   (a) a reservoir,
      (1) a cover plate mounted on said lubricant reservoir and forming a support member,
   (b) a solenoid mounted on said support member,
      (1) an armature operatively associated with said solenoid for reciprocating motion of said armature,
      (2) an abutment mounted on said armature and supported thereabove and movable therewith,
      (3) said solenoid including an electrical winding, and which has an electrical circuit associated therewith,
   (c) a switch associated with said support member,
      (1) said switch having an outwardly extending, arcuately movable arm thereon to open and close contacts associated with said switch,
      (2) said outwardly extending arm being engageable with said abutment upon reciprocation of said armature to actuate said switch to sequentially energize said electrical winding of said solenoid,
   (d) a lubricant pump,
      (1) a pump plunger reciprocable within said pump,
      (2) said pump plunger being operatively associated with said armature to the reciprocation of said armature will pump lubricant, under pressure, from said reservoir.

10. A mechanism for dispensing lubricant, under high pressure, as defined in claim 9; wherein
   (a) said abutment mounted on said armature and supported thereabove and movable therewith is an inertia member, which inertia member is of greater diameter than said armature to form a shoulder, and which is of substantial mass,
   (b) a spring surrounding said armature and being in abutting relation with the shouldered portion of said inertia member so as to support the weight of said inertia member.

11. A grease gun having a reservoir,
   (a) a grease pump mounted centrally of said reservoir near the bottom thereof,
      (1) a cover plate mounted on said reservoir and forming a base,
   (b) a support member associated with said cover plate and extending upward above said reservoir,
   (c) an electrical circuit, (d) a solenoid mounted on said support member,
- (1) a solenoid armature operatively associated with said solenoid,
- (2) a pump plunger operatively mounted in said grease pump and being operatively associated with said solenoid armature, (e) an arcuately movable switch associated with said support member for actuation by the armature of said solenoid,
- (1) said solenoid and said switch associated with said electrical circuit, (f) a conduit leading from said grease pump in said reservoir, and (g) a switch within said electrical circuit adapted to open and close said circuit at periodic intervals to energize said solenoid independently of the movement of said solenoid armature.

12. A grease gun comprising a pump,
(a) an electrical circuit,
(b) a solenoid associated with said electrical circuit and being connected to said pump,
(c) a switch within said electrical circuit,
- (1) said switch being a thermal switch which is adapted to open when a predetermined amount of heat is generated within said circuit,
- (2) said thermal switch being adapted to close at such periodic intervals as to give uniform reciprocation to the armature of said solenoid, (d) a grease reservoir attachably connected to said pump,
(e) conduit means leading from said pump, and
(f) a pressure actuated switch within said conduit for controlling the flow of electrical current to said solenoid.

References Cited by the Examiner

UNITED STATES PATENTS

| | | | |
|---|---|---|---|
| 983,943 | 2/1911 | Smith | 222—333 |
| 1,775,293 | 9/1930 | Pfening et al. | 222—54 X |
| 2,686,281 | 8/1954 | Shum | 222—333 X |
| 2,694,508 | 11/1954 | Petrenchak | 222—333 X |
| 2,705,093 | 3/1955 | Carter | 222—333 |
| 3,009,605 | 11/1961 | Ripley | 222—76 X |
| 3,054,533 | 9/1962 | Kurek | 222—504 X |

ROBERT B. REEVES, *Primary Examiner.*

LOUIS J. DEMBO, *Examiner.*

A. N. KNOWLES, *Assistant Examiner.*